United States Patent [19]

Remec

[11] Patent Number: 4,638,288
[45] Date of Patent: Jan. 20, 1987

[54] THERMAL LEVEL DETECTOR FOR CONDUCTIVE OR NONCONDUCTIVE LIQUIDS OR GASES

[76] Inventor: Matthew J. Remec, 2337 S. Fifth Ave., North Riverside, Ill. 60546

[21] Appl. No.: 197,005

[22] Filed: Mar. 22, 1982

[51] Int. Cl.⁴ ............................................. G08B 21/00
[52] U.S. Cl. .................................. 340/52 F; 340/59; 340/60; 340/622
[58] Field of Search ................. 340/622, 52.F, 59, 60, 340/540; 338/28, 13

[56] References Cited

U.S. PATENT DOCUMENTS

| | | | |
|---|---|---|---|
| 3,412,610 | 11/1968 | Prussin | 340/622 |
| 3,641,488 | 2/1972 | Mullin | 340/52 F |
| 3,792,456 | 2/1974 | Hill | 340/622 |
| 3,903,495 | 9/1975 | Marcoux | 338/28 |
| 3,922,658 | 11/1975 | Harper et al. | 340/622 |
| 4,038,634 | 7/1977 | Caliri | 340/52 F |
| 4,065,760 | 12/1977 | Feldon | 338/28 |
| 4,110,740 | 8/1978 | Akita et al. | 340/59 |
| 4,184,146 | 1/1980 | Fratzke et al. | 340/52 F |
| 4,194,195 | 3/1980 | Merrell et al. | 340/52 F X |
| 4,222,031 | 9/1980 | Okamoto et al. | 340/52 F |
| 4,231,025 | 10/1980 | Turner, Jr. | 340/52 F X |
| 4,258,421 | 3/1981 | Juhasz et al. | 340/52 F X |
| 4,317,106 | 2/1982 | Hüber | 340/52 F |
| 4,333,070 | 6/1982 | Barnes | 340/407 |

Primary Examiner—Glen R. Swann, III

[57] ABSTRACT

An all electronic, no moving parts, low cost, warning system, quickly and reliably alerts operator of malfunctions in levels, temperatures and pressures on trucks, farm implements, autos, boats, aircrafts, machinery, etc., which if not immediately attended to, may cause costly damage or even loss of life. Specifically gives aural and visual warning for: Low brake-fluid level, low transmission-fluid level, low engine-oil level, low differential-oil level, low coolant level, even low windshield-washer-fluid level, low fuel level, engine overtemperature, engine oil-pressure loss, loss of vacuum for power-brake assist, etc., in any single function, combination or extension, as pertaining to a particular truck, farm implement, auto, boat, aircraft, or similar machinery, all this being done by means of all-electronic parts, resulting into high reliability.

15 Claims, 6 Drawing Figures

THERMAL LEVEL DETECTOR FOR CONDUCTIVE OR NONCONDUCTIVE LIQUIDS OR GASES

BACKGROUND OF THE INVENTION

Field of Invention

This invention relates generally to level detectors and monitoring circuits and particularly to a positive temperature coefficient thermistor warning system for indicating the abnormal level of a liquid or gas.

Description of the Prior Art

Major damage to a vehicle can occur while the operator is watching the traffic, the field he is harvesting, navigating the boat or aircraft, etc. and thus not noticing even the idiot-lights/gauges constantly that may already be provided for. Damage can also occur as a result of a (sudden) loss of brake-fluid, power-brake-vacuum, causing the (near) loss of braking with the possible result of a collision with the attendant loss of life and property. A loss of transmission-fluid level, engine-oil level, radiator coolant level, a loss of engine oil-pressure, or engine-overtemperature, may similarly lead to an expensively-damaged transmission or seized engine.

Experiments show that under typical conditions, an average driver/pilot/operator, etc., scans the dash approximately once every ten minutes. Thus the present idiot-light/gauge equipments permit as much as ten minutes to go by, without having operator notice that oil-pressure was lost or that engine temperature is excessive, etc., during which time major costly damage may have already occured.

For a long time dipsticks were provided for measuring engine-oil-levels, transmission-oil-levels, etc., likewise, inspection covers/plugs on brake-fluid, hydraulic-fluid, etc., reservoirs and in cooling systems, radiator caps were provided etc.. Unfortunately these means are inconvenient, suffer from really assuring operator of proper levels only at the time of inspection and in the case of pressurized cooling systems, can not be inspected during vehicle/machinery operation because of pressurization.

Furthermore, most vehicles are not even "real-time" instrumented for the critical fluid-levels of: brake-fluid level, transmission oil-level, engine-oil level etc.. That is although dipsticks etc. are provided, these are useless while the vehicle is being operated and can not be relied upon for detection of sudden-brake-fluid loss or sudden coolant loss etc., i.e. as a result of a burst hose, rusted out tubing, etc., while the vehicle is in operation. Although the likelihood of these events is very small, the price of the risk is by no means small.

Examples of recent patents in the probe area are U.S. Pat. Nos. 4,001,802, 4,020,481 and 4,025,846; and in the warning system area U.S. Pat. Nos. 4,184,146, 4,194,195, 4,222,031, 4,231,025, 4,317,106, 4,258,421. Shortcommings of these prior devices are: Use of moving mechanical/electromechanical parts, low tolerance to dirty-liquid environments, complexity and perhaps higher overall cost. Some of these shortcommings are overcome by present invention. Furthermore, real-time, operational function monitoring is provided for.

BRIEF DESCRIPTION OF THE INVENTION

The foregoing problems are solved and a technical advance is achieved by a positive temperature coefficient thermistor warning system for indicating in one illustrative embodiment, for example, that the level of a liquid in a vessel is below a predetermined level. the warning system comprises a thermistor, means for thermally coupling the thermistor to the liquid when the level of the liquid is above the predetermined level, means for thermally insulating the coupling means from the vessel, and a warning circuit directly connected to the thermistor and electrically isolated from the liquid for generating a warning signal indicating that the level of the liquid is below the predetermined level. Having a turnover temperature, the thermistor assumes a first resistance when the temperature of the thermistor is above the turnover temperature and a second resistance when the temperature of the thermistor is below the turnover temperature. When the level of the liquid is above the predetermined level, the coupling means thermally couples the thermistor to the liquid, and the liquid lowers the temperature of the thermistor below the turnover temperature. When the level of the liquid is below the predetermined level, the thermistor assumes the first resistance, and the warning circuit generates the warning signal.

The warning system further includes a tone generator for sounding the warning signal and an annunciator for displaying the warning signal. When installed, for example, in a vehicle, this system quickly alerts an operator both audibly and visually of an abnormal level condition.

This system may also be utilized to indicate loss of vacuum, for example, in a vacuum-assisted vehicle braking system. In this embodiment, the temperature of the thermistor in an evacuated environment normally remains above the turnover temperature with the thermistor assuming a first resistance. As a gas is introduced into the environment, the gas reduces the temperature of the thermistor causing the thermistor to assume a lower, second resistance when the pressure of the gas is above a predetermined level. A warning circuit generates a warning signal indicating the abnormal pressure level. A tone generator and annunciator may also be implemented to alert, for example, a vehicle operator.

A monitoring system incorporates several PTC thermistors and warning circuits to monitor two or more level conditions of, for example, oil, coolant, brake fluid, etc. The temperature of these fluids may also be monitored for abnormal conditions. A single tone generator may be used to alert an operator of an abnormal condition and a visual annunciator to display the specific abnormal condition.

The warning and monitoring systems also include means for thermally insulating the thermistor from the vessel. This is to increase the response time of the system to level changes and to prevent false indications caused by the heating or cooling characteristics of the vessel.

An object of this invention is a low cost, all-electronic warning system, for fluid-levels, temperatures and pressures, having no moving parts (within the hostile, dirty environments) tolerant of transients in monitored functions, without falsely alarming. Embodying one or a plurality of said functions, it is called Danger-Monitor ©, DM. When a malfunction does occur, system at once (unobtrusively) auraly reminds operator to immediately look at the DM anunciator, displaying failed function(s). Thus the infrequent idiot-light/gauge scan, causing noticeability-delay, is eliminated, having been found before to be typically minutes long during which the damage that prior art idiot-lights/gauges guard against, could have already occurred. Level monitoring is accomplished by means of Positive Temperature Coefficient, PTC, thermistors heated by means of seriesed resistors to the voltage source. Liquid covering said PTC thermistor on a level-probe cools thermistor sufficiently, that turnover temperature (where PTC thermistor drastically increases its resistance, also referred to as the Curie temperature) can not be reached. If liquid level is too low, uncovering the said PTC thermistor, heat can no longer be dumped into fluid and soon raises said PTC thermistor temperature past turnover temperature, $T_c$. The vastly increased resistance causing increased voltage across said PTC thermistor is sensed by circuitry, causing aural alerting and lighting of proper anunciator Light Emitting Diode, LED, other luminaire or visual alerting devices Vacuum or gas pressure is sensed in a similar way. For slightly conductive fluids, the resistance to vessel/ ground of an immersed electrode similarly triggers circuitry of the system, depending on fluid level presence/absence. Other electronic circuitry monitors sudden oil-pressure loss, (engine) overtemperature and low fuel level based on elsewhere provided for electrical inputs to the circuitry, but resulting in apropriate complementary alerting by the DM system.

DESCRIPTION OF THE DRAWINGS

The invention is described with reference to the following drawings of which.

DESCRIPTION OF THE PREFERRED EMBODIMENT

Figure 1:
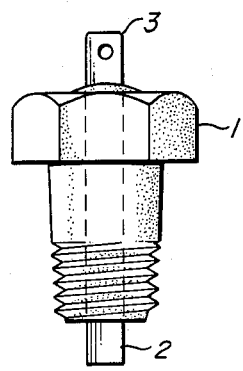
FIG. 1 is a drawing of a mildly conductive-fluid level probe, suitable for Original Equipment Manufacturers, OEM, use.
Figure 2:
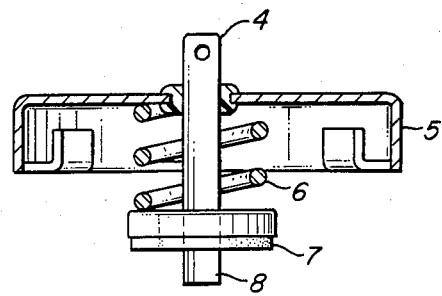
FIG. 2. is a drawing of a radiator cap equipped with a conductive-fluid level probe suitable for the OEM and aftermarket applications.

The probes for the liquid-level presence or absence, used in the DM, take the following forms:

(A) For the mildly conductive environment of such fluids as coolant or similar, a rust-resistant electrical-continuity probe such as a carbon rod, stainless steel, etc., shown in FIG. 1. is placed at the proper elevation in the (electrically chassisgrounded) radiator, or in the radiator-cap itself (for the aftermarket installations) shown in FIG. 2. Depicted in FIG. 1 is a probe for sensing conductive fluid levels comprising a plastic encased body 1, a carbon or stainless steel electrode 2, and single wire connector terminal 3 for OEM applications. Depicted in FIG. 2 is a cross section of a radiator cap 5 with connector 4, gasket pressure spring 6, radiator pressure gasket 7, and fluid contacting electrode 8 for aftermarket applications. Thus when coolant is present the resistance of the probe to ground is tens to hundreds of Kiloohms, turning the transistor 54 ON in FIG. 3. and when the coolant is absent, the leakage resistance is (many) Megaohms, turning the transistor 54 OFF. This probe is also applicable to windshield-washer-fluid level sensing. Note that all these level probes have no moving parts.

Figure 4:
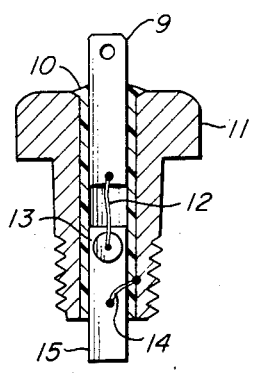
FIG. 4. shows a nonconductive-fluid PTC thermistor level-sensing probe for chassisground return type applications. This probe may also be used on conducting-fluids, although it costs more.
Figure 6:
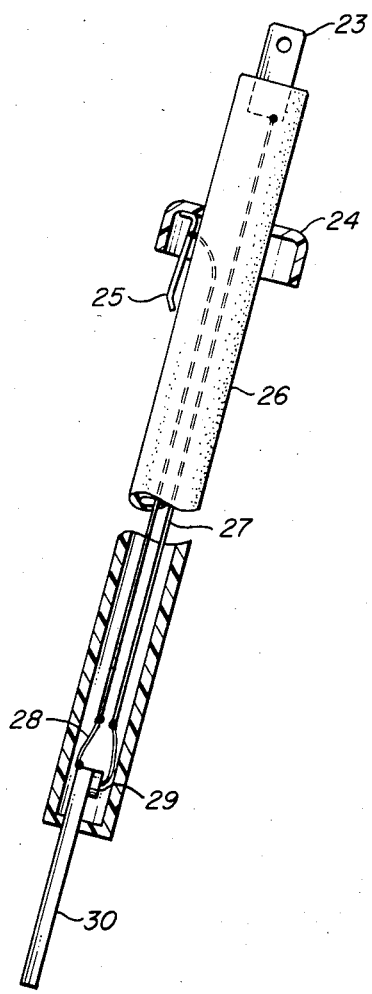
FIG. 6. shows a PTC thermistor fluid level probe, featuring single wire ground return, with adjustable level-alarm-point, suitable for special applications, OEM, or aftermarket use.

(B) For the nonconductive liquid environments such as engine-oil, transmission-oil, differential-oil, crude-oil and similar fluids, etc., a Positive Temperature Coefficient, PTC, thermistor with a turnover (Curie) temperature, $T_c$, chosen well above any normal-operational-temperature, say 160° C., 320° F., for engine-oil, transmission-oil, etc., is housed and mounted on a dipstick as shown in FIG. 6. Depicted in FIG. 6 is a dipstick 26 for sensing nonconductive fluid levels with PTC thermistor level probe 29, single wire connector 23, level alarm setting cap 24, grounding clip 25, filamentary wires 27 and 28, and thermal probe extension 30 for aftermarket applications. This form lends itself well to the conversion of vehicles in early DM installations or aftermarket usage. The PTC thermistor is resistor series-fed, or heated by a small separate heating element. As long as the so-generated heat is carried away by the oil contacting the thermistor, thermistor housing, or thermal probe extension, the said thermistor resistance remains low, causing the associated circuitry, given schematically in FIG. 3, to indicate "All is well" with the level associated with this probe. However, when the oil is not present to remove the heat, the temperature of the thermistor rises in about ten seconds and "Alarms" as described below. Note that the PTC thermistor intrinsic-time-delay is beneficial in automotive, truck, farm-implement, boat, aircraft, etc. environments, because the fluid (oil, etc.) may be temporarily dislocated because of splashing, a high speed vehicle turn, yet the DM is saved from a false alarm, by said time-delay and thus does not alarm falsely. For still other OEM type installations, the probe in FIG. 4. might be used, it requires a tapped hole at the proper oil-level. Depicted in FIG. 4 is a cross section of a PTC thermistor level probe for nonconductive fluids with single wire connector 9, thermally and electrically insulating sleeve 10, metallic body 11 making ground contact, filamentary wire 12 and interconnecting PTC thermistor 13 and connector 9, and filamentary wire 14 interconnecting thermal probe extension 15 and metallic body 11. Eventhough liquid levels are normal, the DM will also alarm in response to excessive liquid temperatures, greater than the PTC thermistor $T_c$, brought about by such abnormalities as excessive friction, plugged transmission-oil coolers, etc., rendering yet another degree of protection.

(C) The (brake etc.) vacuum monitoring can also be done in a similar way. When there is a "vacuum" in the chamber, the major share of the heat generated by the series resistor-fed (current-fed) PTC thermistor is not dumped, raising the temperature over $T_c$. Here however DM logic is such that DM alarms when there is no vacuum, that is gas (air) is present into which the PTC thermistor generated heat is dumped, cooling said PTC thermistor below $T_c$, lowering resistance by orders of magnitude, as can be observed from FIG. 3. and examination of vacuum/pressure probe in FIG. 5. by one skilled in the art.

Figure 5:
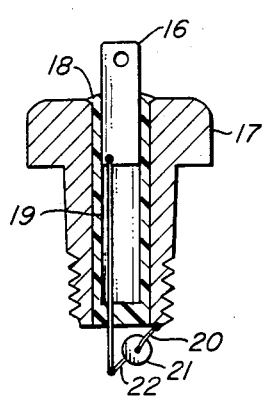
FIG. 5. shows a PTC thermistor vacuum/pressure gas probe.

Depicted in FIG. 5 is a cross section of a PTC thermistor vacuum and gas pressure sensing probe with single wire connector 16, metallic body 17, thermally and electrically insulating sleeve 18, filamentary wires 19, 20, and 22 connected to thermistor 21 for the OEM market.

Figure 3:
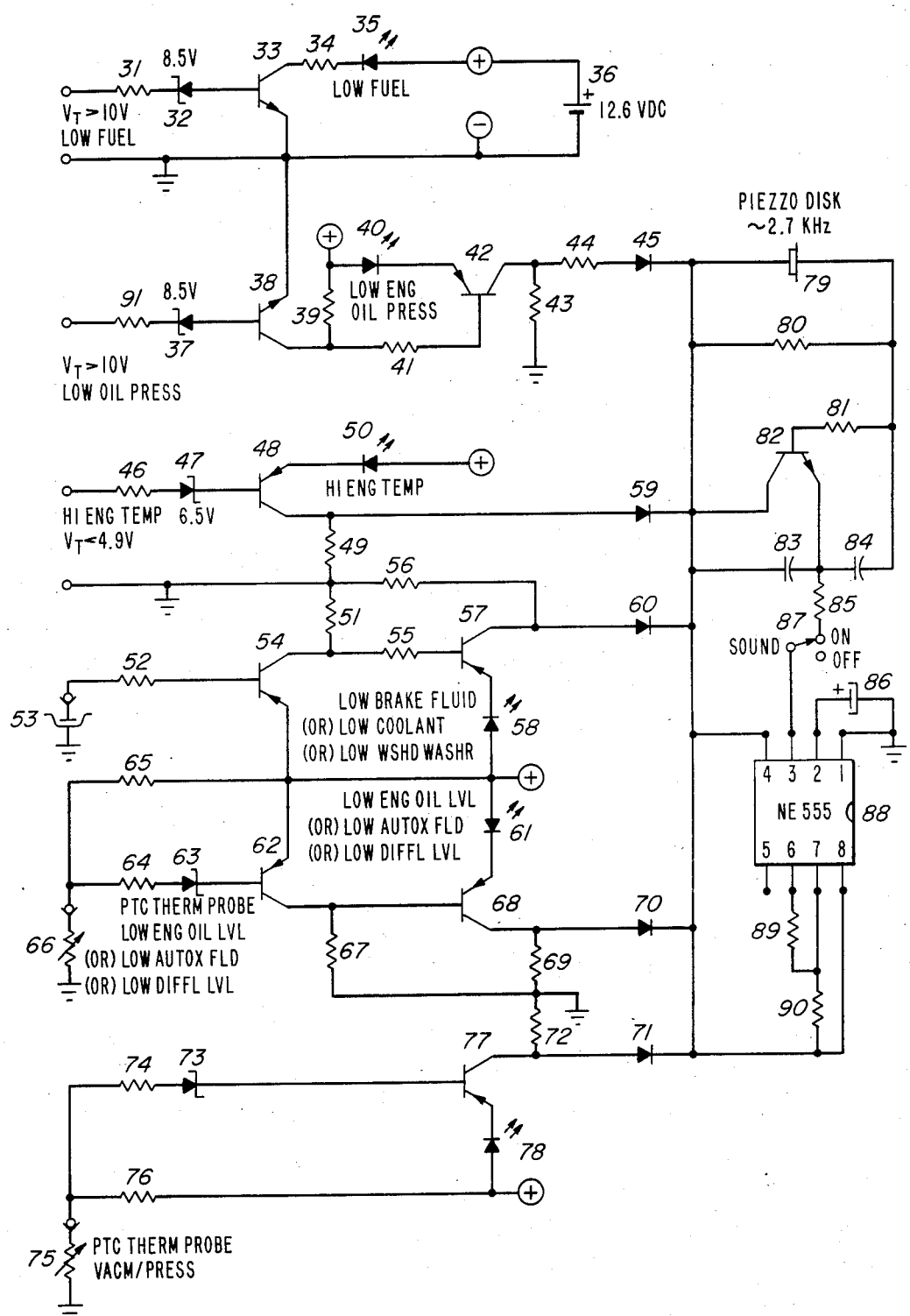
FIG. 3. is an electrical schematic for a possible 12.6 VDC, negative ground DM application. A representative number of level sensing probes and associated circuits is shown.

A representative DM schematic for a 12.6 VDC negative ground application is shown in FIG. 3. Only one representative level sensor circuit for conductive fluids and one for nonconductive fluids is shown, but one skilled in the art can readily expand the circuitry to a multiplicity of circuits, different supply voltages, a positive ground system, all of which are in the spirit of this invention. It includes aural alarming, defeatable by switch 87, approximately every five seconds for about a half second of sound. After the operator hears the alarm and notices the malfunction on the LED (or other high-reliability, low cost luminaire) annunciator, the aural immediate-attention-getter may be switched off, provided immediate action is not required. Note also from FIG. 3. that the DM alarms for low oil-pressure, engine overtemperature and low fuel level, are based on typical inputs from existing idiotlight/gauge sensors in most applications of trucks, cars, boats, etc.

While only representative embodiments are shown for the present invention, they are susceptible to numerous changes and modifications, as known to one skilled in the art and I, therefore, am not limiting the claims to what is shown, but rather extend them to cover all such changes and modifications as comprised by the scope of the claims included herein and as can be extended by one skilled in the art, within the spirit of this invention.

What is claimed is:

1. A monitoring system comprising:
    a thermistor (13) having a turnover temperature, said thermistor assuming a predetermined resistance when the temperature of said thermistor is above said turnover temperature;
    means (15) for thermally coupling said thermistor to a liquid in a vessel when the level of said liquid is above a predetermined level, said liquid lowering the temperature of said thermistor below said turnover temperature when thermally coupled thereto;
    means (10) for thermally insulating said coupling means from said vessel;
    a tone generator (45, 59, 60, 70, 71, 79-90) for sounding a plurality of warning signals;
    a warning circuit (9, 11, 12, 14, 15) directly connected to said thermistor and electrically isolated from said liquid for generating one of said warning signals indicating that the level of said liquid is below said predetermined level when said thermistor assumes said predetermined resistance; and
    an annunciator (61-65, 67-69) for displaying said one warning signal.

2. The monitoring system of claim 1 wherein said system further comprises:
    a second thermistor (13) having a second turnover temperature, said second thermistor assuming a second predetermined resistance when the temperature of said second thermistor is above said second turnover temperature;
    second means (15) for thermally coupling said second thermistor to a second liquid in a second vessel when the level of said second liquid is above a second predetermined level, said second liquid lowering the temperature of said second thermistor below said second turnover temperature when thermally coupled thereto;
    means (10) for thermally insulating said second means from said second vessel;
    a second warning circuit (9, 11, 12, 14, 15) directly connected to said second thermistor and electrically isolated from said second liquid for generating another one of said warning signals indicating that the level of said second liquid is below said second predetermined level when said second thermistor assumes said second predetermined resistance; and
    a second annunciator (51, 52, 54-58) for displaying said other one warning signal.

3. The monitoring system of claim 2 wherein said system further comprises means (10, 12, 14) for thermally insulating said First-recited thermistor from said first-recited vessel and means (10, 12, 14) for thermally insulating said second thermistor from said second vessel.

4. The monitoring system of claim 1 wherein said system further comprises:
    a second thermistor (21) having a second turnover temperature for detecting when the pressure of a gas in a vacuum chamber is above a second predetermined level, said second thermistor assuming a second predetermined resistance when the temperature of said second thermistor is below said second turnover temperature, said gas lowering the temperature of said second thermistor below said second turnover temperature when said gas is thermally coupled to said second thermistor and the pressure of said gas is above said second predetermined level,
    a second warning circuit (16, 17, 19, 20, 22, 76) directly connected to said second thermistor and electrically isolated
    from said gas for generating another one of said warning signals indicating that the pressure of said gas is above said second predetermined level when said second thermistor assumes said second predetermined resistance, and
    a second annunciator (72-74, 76-78) for displaying said other one warning signal.

5. The monitoring system of claim 4 wherein said system further comprises First-recited means (18, 19, 20, 22) for thermally insulating said second thermistor from said vacuum chamber.

6. The monitoring system of claim 1 wherein said system further comprises:
    a second thermistor (13) having a second turnover temperature , said second thermistor assuming a second predetermined resistance when the temperature of said second thermistor is above said second turnover temperature;
    second means (15) for thermally coupling said second thermistor to said liquid when the level of said liquid is above said predetermined level, said liquid raising the temperature of said second thermistor above said second turnover temperature when the temperature of said liquid is above said second turnover temperature and said liquid is thermally coupled to said second thermistor;
    means (10) for thermally insulating said second means from said vessel;
    a second warning circuit (9, 11, 12, 14, 15) directly connected to said second thermistor and electrically isolated from said liquid for generating another one of said warning signals indicating that the temperature of said liquid is above said second turnover temperature when said second thermistor assumes said predetermined resistance; and a second annunciator (46-50) for displaying said other one warning signal.

7. The monitoring system of claim 6 wherein said system further comprises means (10, 12, 14) for thermally insulating said First-recited thermistor from said vessel and means (10, 12, 14) for thermally insulating said second thermistor from said vessel.

8. The monitoring system of claim 1 wherein said annunciator includes a light-emitting diode (61) for displaying one warning signal.

9. The monitoring system of claim 1 wherein said system further comprises means (10, 12, 14) for thermally insulating said thermistor from said vessel.

10. A warning system for indicating that the level of a liquid in a vessel is below a predetermined level, comprising:

a thermistor (13) having a turnover temperature, said thermistor assuming a first resistance when the temperature of said thermistor is above said turnover temperature and a second resistance when the temperature of said thermistor is below said turnover temperature;

means (15) for thermally coupling said thermistor to said liquid when the level of said liquid is above said predetermined level, said liquid lowering the temperature of said thermistor below said turnover temperature when thermally coupled thereto;

means (10) for thermally insulating said coupling means from said vessel; and a warning circuit (9, 11, 12, 14, 15) directly connected to said thermistor and electrically isolated from said liquid for generating a warning signal indicating that the level of said liquid is below said predetermined level when said thermistor assumes said first resistance.

11. The warning system of claim 10 wherein said warning system further comprises a tone generator (70, 79-90) for sounding said warning signal and an annunciator (61-65, 67-69) for displaying said warning signal.

12. The warning system of claim 10 wherein said warning system further comprises means (10, 12, 14) for thermally insulating said thermistor from said vessel.

13. A warning system for indicating that the pressure of a gas is above a predetermined level in a vacuum chamber, comprising:

a thermistor (21) having a turnover temperature and only a positive temperature coefficient, said thermistor assuming a first resistance when the temperature of said thermistor is above said turnover temperature and a second resistance less than said first resistance when the temperature of said thermistor is below said turnover temperature, said gas lowering the temperature of said thermistor below said turnover temperature when said gas is thermally coupled to said thermistor and the pressure of said gas is above said predetermined level; and a warning circuit (16, 17, 19, 20, 22) directly connected to said thermistor and electrically isolated from said gas for generating a warning signal indicating that the pressure of said gas is above said predetermined level when said thermistor assumes said second resistance.

14. The warning system of claim 13 wherein said warning system further comprises means (18, 19, 20, 22) for thermally insulating said thermistor from said vacuum chamber.

15. The warning system of claim 13 wherein said warning system further comprises a tone generator (71, 79-90) for sounding said warning signal and an annunciator (72-74, 76-78) for displaying said warning signal.

* * * * *